United States Patent [19]
Brucker

[11] 3,827,259

[45] Aug. 6, 1974

[54] SELF HEALING CLUTCH

[76] Inventor: William S. Brucker, 1500 Providence Rd., Towson, Md. 21204

[22] Filed: Sept. 29, 1972

[21] Appl. No.: 293,455

[52] U.S. Cl. .................. 64/28 R, 64/29, 192/82 T, 64/30 D, 64/30 E
[51] Int. Cl. ........................ F16d 7/02, F16d 7/06
[58] Field of Search ...... 64/27 NM, 29, 30 R, 30 D, 64/30 E, 28 R; 192/82 T; 403/2

[56] References Cited
UNITED STATES PATENTS

| | | | |
|---|---|---|---|
| 2,032,900 | 3/1936 | Alger | 64/30 D |
| 2,539,534 | 1/1951 | Eckhardt | 64/78 R X |
| 3,064,454 | 11/1962 | Sharples | 192/82 T |
| 3,093,984 | 6/1963 | Andrews et al. | 64/29 |
| 3,186,190 | 6/1965 | Maillot | 64/30 R |
| 3,193,068 | 7/1965 | Greve et al. | 64/28 R X |
| 3,407,627 | 10/1968 | Latsch et al. | 64/30 E X |
| 3,481,160 | 12/1969 | Georgi | 64/30 R |
| 3,521,464 | 7/1970 | Kidby | 64/27 NM |

FOREIGN PATENTS OR APPLICATIONS

| | | | |
|---|---|---|---|
| 1,220,004 | 1/1960 | France | 64/30 E |
| 510,000 | 10/1930 | Germany | 64/28 R |

*Primary Examiner*—Allan D. Herrmann

[57] ABSTRACT

A power operated device, such as a portable power tool or the like, including a motor driven, rotary member coupled to an output member by a novel clutch. In accordance with the invention, the clutch is constructed to transmit torque from the motor driven member to the output member, under normal conditions; however, the clutch is designed to fail in shear or in cold flow, to allow relative rotation between the motor driven and output members, when the torque level in the device exceeds a predetermined safe value. The clutch is constructed to heal and recouple the driven and output members when the excessive torque level condition has been removed.

1 Claim, 4 Drawing Figures

PATENTED AUG 6 1974　　　　　　　　　　　　　　　　　　　　3,827,259
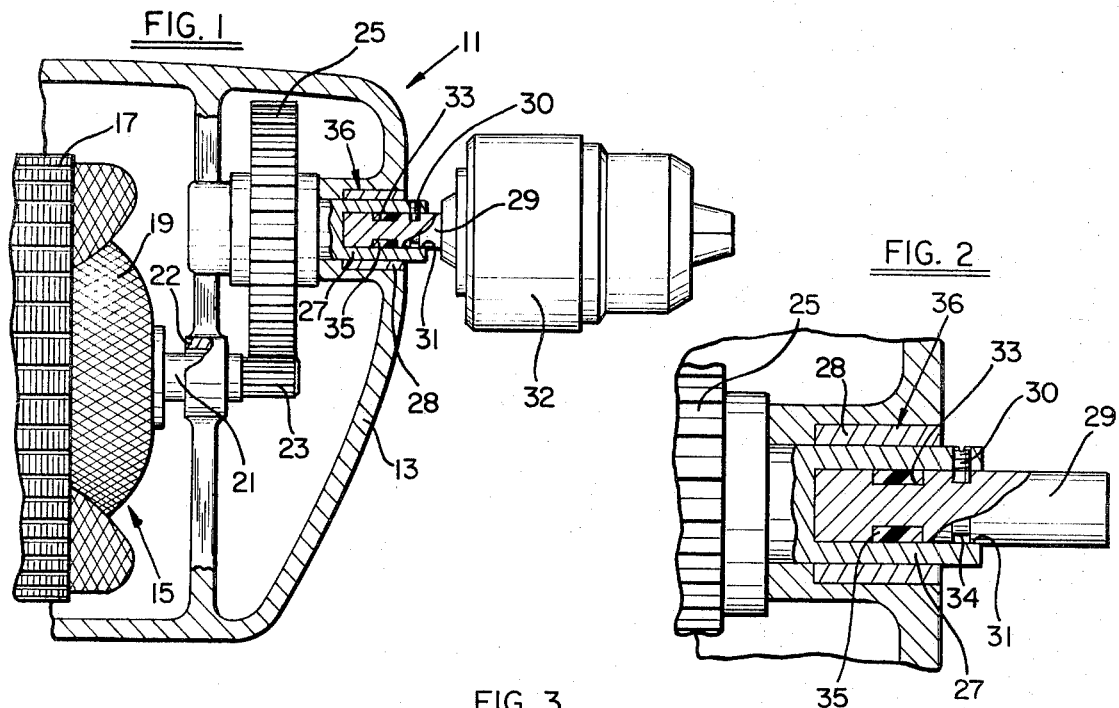
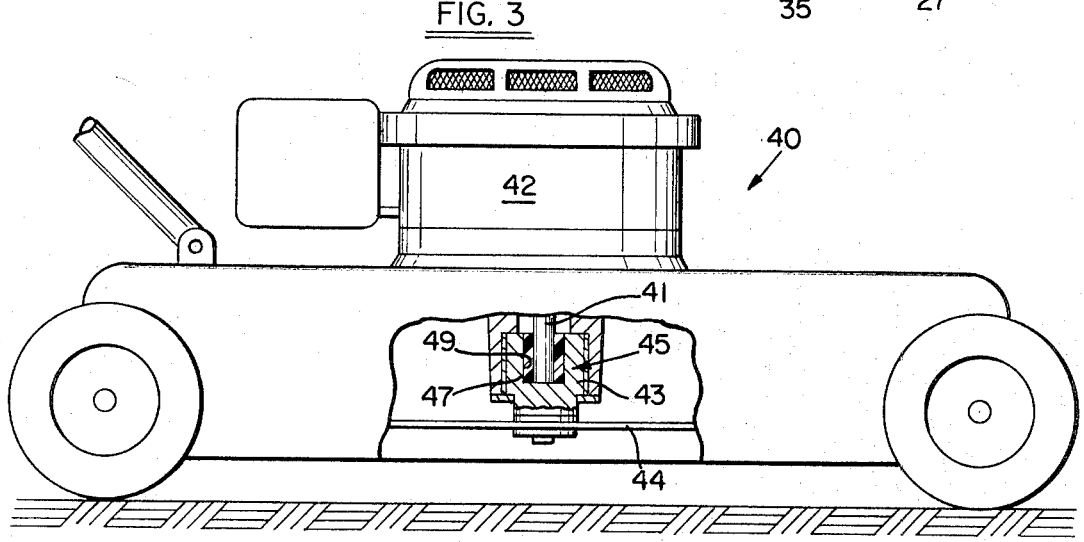
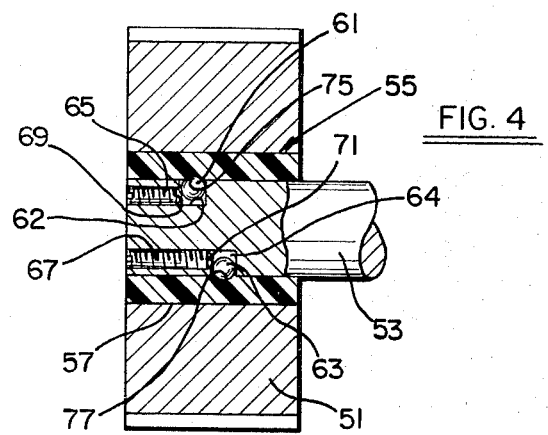

SELF HEALING CLUTCH

SUMMARY OF THE INVENTION

The present invention is directed to an improved, torque transmitting clutch for power operated devices, such as portable power tools and the like. The inventive clutch includes a thermoplastic member interposed between and coupling a pair of rotatable members. The thermoplastic material is selected and sized, and the rotatable members sized and positioned, so that under "normal" operating conditions of the device, the rotatable members are coupled together for conjoint rotation. However, when the torque level in the device exceeds a predetermined value, such as one above which damage could result in mechanical or electrical component parts of the device, the coupling between the thermoplastic member and one or both of the rotatable members, in one version, "fails" in shear thereby allowing the rotatable members to rotate with respect to one another and preventing the excessive torque level in the device from causing part damage. The rotatable members and the thermoplastic member are constructed and arranged such that following failure of the clutch and subsequent removal of the undesirable excessive torque level from the device, the coupling "reheals" and the thermoplastic member recouples the rotatable members for conjoint rotation. In another version, excessive torque in the device causes cold flow of the thermoplastic member and resultant clutch failure or slippage. Upon removal of the undesirable torque condition, the clutch reheals. In both versions, if desired, the thermoplastic member can be utilized to inhibit overspeed of the clutch input upon failure. In addition, the novel clutch of the present invention is designed with the utmost in simplicity, and corresponding low cost, and is characterized by its efficient, effective and consistent performance, as well as its wide spread adapability for use in a variety of devices, such as portable power tools, lawnmowers, and the like, both electric motor driven as well as gasoline powered.

BRIEF DESCRIPTION OF THE DRAWINGS

FIG. 1 is a sectional view illustrating a portion of a portable power tool embodying a preferred form of the present invention;

FIG. 2 is an enlarged view of a portion of FIG. 1;

FIG. 3 is a sectional view illustrating a portion of a lawnmower embodying modified form of the invention; and FIG. 4 is still another view illustrating a still further modified form of the invention.

DETAILED DESCRIPTION

Referring now to the drawings, there is shown, in FIG. 1, a portable power tool 11 such as, for example, an electric drill, screwdriver, or the like, and which includes a housing 13 having an electric motor 15 disposed and supported therein. The motor 15 includes a stationary field 17 carried by the housing 13, and a rotatable armature 19, the latter including a rotatable armature shaft 21 supported by a bearing 22. Pinion teeth 23 on the end of the armature shaft 21 drivingly engage the teeth of a gear 25 fixed to a spindle 27 rotatably supported by bearing 28. An output shaft 29 has a portion rotatably supported within a bore 31 in the spindle 27, and is retained therein by a set screw 30 received in a slot 34. The shaft 29 extends outwardly of the spindle 27 for connection to suitable means such as a tool chuck 32.

In power tools of this type, it sometime occurs that the tool output (shaft 29 and chuck 32) becomes severely restricted or locked against rotation. When this occurs, severe loading conditions develop in the tool and, if provision is not made to accommodate these conditions, damage can result to component parts of the power train and/or the motor. Power tools of this type sometimes embody built in slip clutch means calculated to accommodate these severe torque loading conditions. However, because conventional slip clutch means often is expensive, and contributes greatly to the overall size and weight of the tool, their use has been quite limited.

The present invention is directed to a relatively small, and inexpensive slip clutch concept adapted for use in a wide variety of power tools and the like where severe torque loading conditions can arise and might, if unchecked, result in damage to the power train and/or the motor. Furthermore, the present inventive slip clutch is constructed to occupy a minimum of space, contribute little if any weight, and is relatively inexpensive, so that it can readily be included in even low cost devices.

As shown in FIG. 1, the output (chuck) shaft 29 is slip fitted in the bore 31 of spindle 27. The shaft 29 is provided with an annular recess 33 in which is disposed a thermoplastic coupling member 35 forming part of a slip clutch 36. The radial dimensions of the member 35 are such that it bonds against and adheres to the wall of recess and that of the bore 31 of spindle 27 and normally couples the spindle 27 and shaft 29 for conjoint rotation. However, when excessive torque loading occurs in the tool, the adhesive force of the material of coupling 35 to the shaft 29 and/or the spindle 27 (likely the spindle 27), or the shear strength of the coupling material, is exceeded and the clutch "fails" in shear. Thus, depending upon the nature of the material of coupling 35, its radial dimensions and its thickness, or the dimensions of the recess 33 and bore 31 and the adhesive strength of the coupling material, the shaft 29 and spindle 27 will rotate relative to one another when a predetermined torque level in the tool is exceeded.

When clutch "failure" or slippage occurs, that is when the shaft 29 and spindle 27 undergo relative rotation, heat is developed at the "sheared" surface, likely the surface between the coupling 35 and the wall 31 of spindle 27, or at some area of the coupling 35 itself. This heat will melt or soften the material of coupling 35 at this surface so that when the excessive torque condition is removed, the softened or melted surface of coupling 35 will rebond to the surface 31 of spindle 27. Thus, the slip clutch is "self-healing" in nature.

As described above, the operating characteristics of the clutch of this invention is controlled and varied by proper selection of material for the thermoplastic coupling 35, and by controlling the dimensions of this coupling and its surrounding parts. However, in applications where it is necessary to control the speed of the driving motor and prevent it from "running away" following clutch slippage, the nature and characteristics of the thermoplastic coupling 35 can be employed. The embodiment of FIG. 3 represents a variation of the invention and illustrates a lawnmower 40 including a shaft 41 driven by a gasoline engine 42. The shaft 41 is coupled to a blade spindle 43 by a thermoplastic slip clutch 45. As shown, the slip clutch 45 includes a relatively long axial dimensioned thermoplastic coupling 47 disposed in a bore 49 of the spindle 43 and surrounding the shaft 41. As in the embodiment of FIGS. 1 and 2, coupling 47 is bonded to and couples shaft 41 and spindle 43.

In use, engine 42 powers shaft 41 and through clutch 45, rotates spindle 43 and a blade 44 fixed thereto. When excessive torque develops in the mower, such as when blade 44 strikes an obstruction, clutch 45 fails either by the coupling 47 shearing from wall of bore 49 in spindle 43 or by the material of coupling 47 itself failing in shear. However, by virtue of the relatively long axial length of the body of thermoplastic coupling 47, this coupling will be caused to expand under the action of heat generated by the relatively rotating shaft 41 and coupling 47, and spindle 43 and will develop a thermal drag on the shaft 41 preventing it from rotating at excessively high speeds. Thereafter, excessive torque condition is relieved, such as when the mower 40 is turned off and the parts 41, 43 at rest, the thermoplastic material of coupling 47 rebonds to itself or to the spindle 43. Thus, like the embodiment of FIG. 1, this clutch 45 is "self-healing."

By way of example and not by way of limitation, thermoplastic couplings from Dupont "Nylon" No. 610 are deemed to be acceptable in characteristics and performance in clutches of the type described. In the embodiment of FIG. 3, using a spindle 43½ inches O. D., the thermoplastic coupling 47 could be approximately three-fourths inch in length and one-eighth inch thick and closely fit to shaft 41 and spindle 43 constructed of steel. With these parts, the slip clutch 45 will demonstrate repeated slippage at the desired torque level and self heals for continued usage.

A still further modified form of the invention is shown in FIG. 4. In this version, gear 51 and a shaft 53 are shown coupled together by a slip clutch 55 comprising an elongated thermoplastic coupling 57 bonded to an internal cylindrical surface 59 of gear 51. The shaft 53 carries a plurality of balls 61, 63 located in pockets 62, 64, and which, as shown, are substantially diametrically opposed and are arranged in closely spaced, relation to one another. A pair of screws 65, 67 are threaded into the shaft 53 and have conically shaped ends 69, 71 engaged with balls 61, 63, respectively, to adjustably hold the latter in engagement with the internal surface of coupling 57. As such, balls 61, 63 cause the material of coupling 57 to cold flow and form complimentary indentations 75, 77 therein.

In use, this version functions somewhat different than the embodiments of FIGS. 1 and 3. Thus, clutch slippage here occurs when the torque in the device exceeds the resistance of the material of coupling 57 to cold flow, and the balls 61, 63 enlarge the indentations 75, 77. In other words, when the clutch 55 slips, the balls 61, 63 cause the material of thermoplastic coupling 57 to cold flow and elongate the indentations 75, 77 and begin to form circumferential tracks or channels around the internal surface of the coupling 57.

The nature of the thermoplastic member 57 is such that it has a "memory" and tends to return to its original configuration. Thus, as the balls 61, 63 enlarge the indentations 75, 77 and begin to form annular tracks, that portion of the coupling 57 behind the balls 61, 63 begins to return to its original and unstressed condition. It will be appreciated that, without more, the track of channel formed by each ball 61, 63 could elongate to an extent completely around the inner periphery of the coupling 57 if the torque load on the clutch 55 remains sufficiently high. Also, relative rotation between the parts generates heat which softens the material of coupling 57 and reduces its resistance to cold flow. However, the circumferential and closely spaced, axial disposition of the balls 61, 63 relative to each other causes each to cold flow material of the coupling 57 axially toward the other. Thus, each ball 61, 63 tends to help close the elongated track formed by the other thereby developing a restraining force on clutch slippage to prevent the motor driven gear 51 from rotating at excessive speeds. Further, the heated coupling 57 expands and exerts thermal drag on the balls 61, 63 to help prevent run away.

It will be apparent that in this embodiment, in addition to material selection for the coupling 57, and size and shape of the various parts, the number, disposition and radial adjustment of the balls 61, 63 can be varied according to the particular performance characteristics required in the slip clutch.

By the foregoing, there has been disclosed a novel slip clutch for use in power tools and the like calculated to fulfill the inventive objects here and above set forth, and while preferred embodiments of the invention have been illustrated and described in detail herein, various additions, substitutions, omissions, and modifications may be made thereto without departing from the spirit of the invention.

I claim:

1. A slip clutch comprising first and second shafts having spaced, confronting annular surfaces, a thermoplastic member interposed between and occupying the space between said annular surfaces, coupling means carried by one of said shafts and projecting into said thermoplastic member, said coupling means including a pair of circumferentially and axially spaced members each of which causes cold flow of the material of said thermoplastic member and tends to form an annular track in said thermoplastic member upon circumferential movement relative to said thermoplastic member when the torque between said shafts exceeds a predetermined level, said thermoplastic material tending to return to its original configuration behind each of said coupling members during relative rotation of said shafts, said tracks being adjacent one another and the material being displaced by one of said coupling members toward the track formed by the other of said coupling members, whereby to retard relative rotation between said members, and means for adjusting the radial projection of said coupling members into said thermoplastic member for adjusting the torque level at which said first and said second shafts are allowed to slip.

* * * * *